UNITED STATES PATENT OFFICE.
===

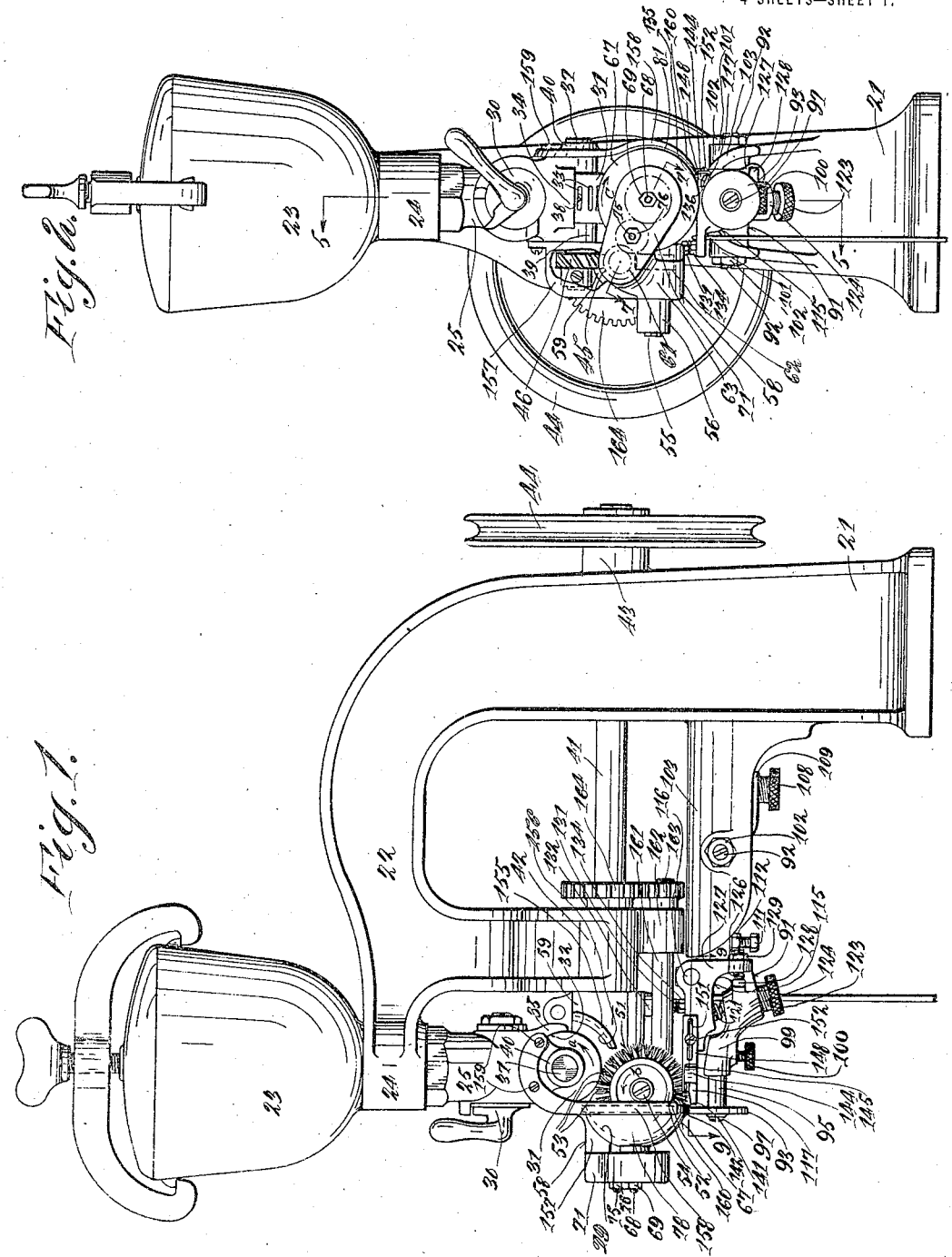

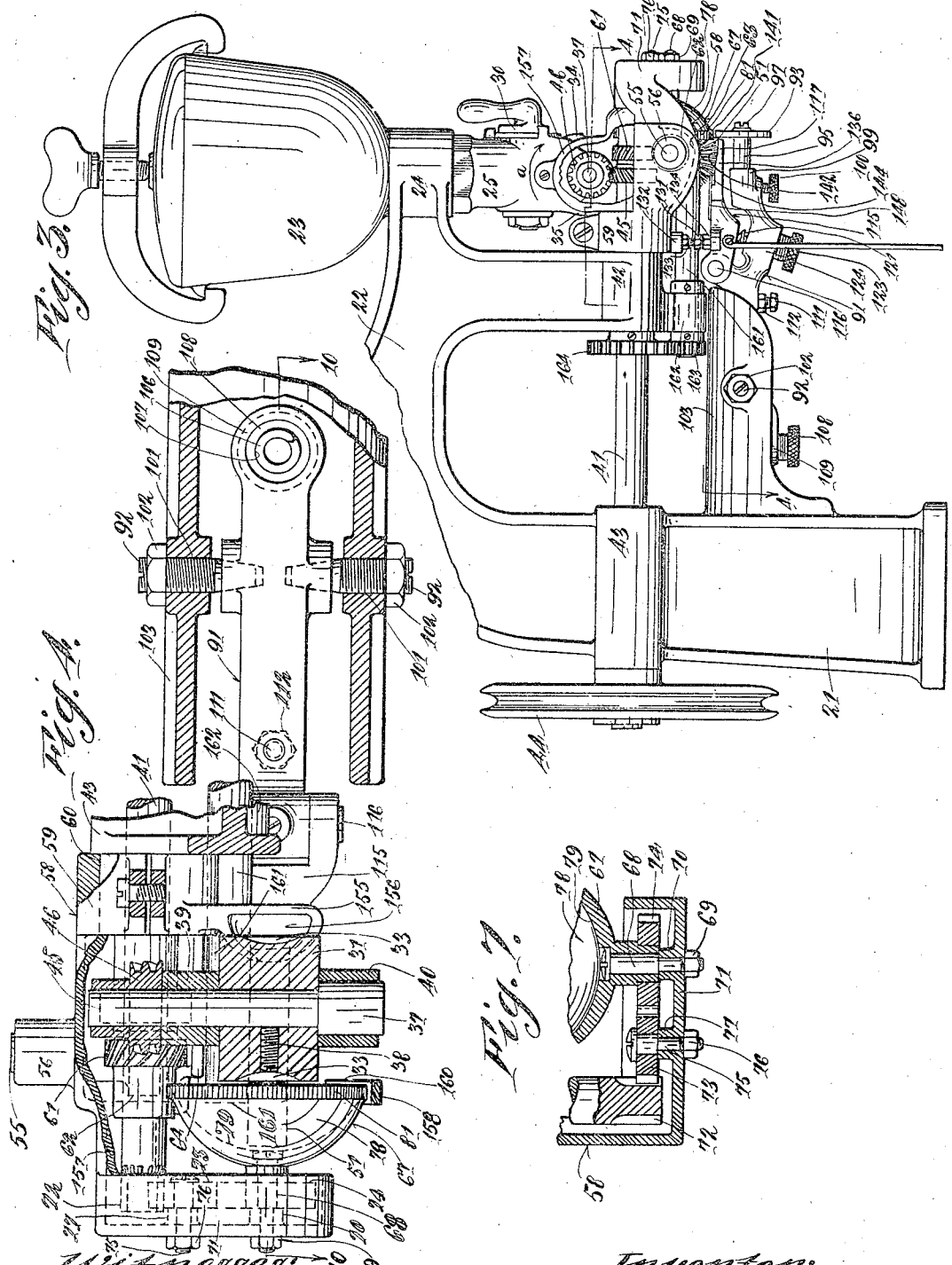

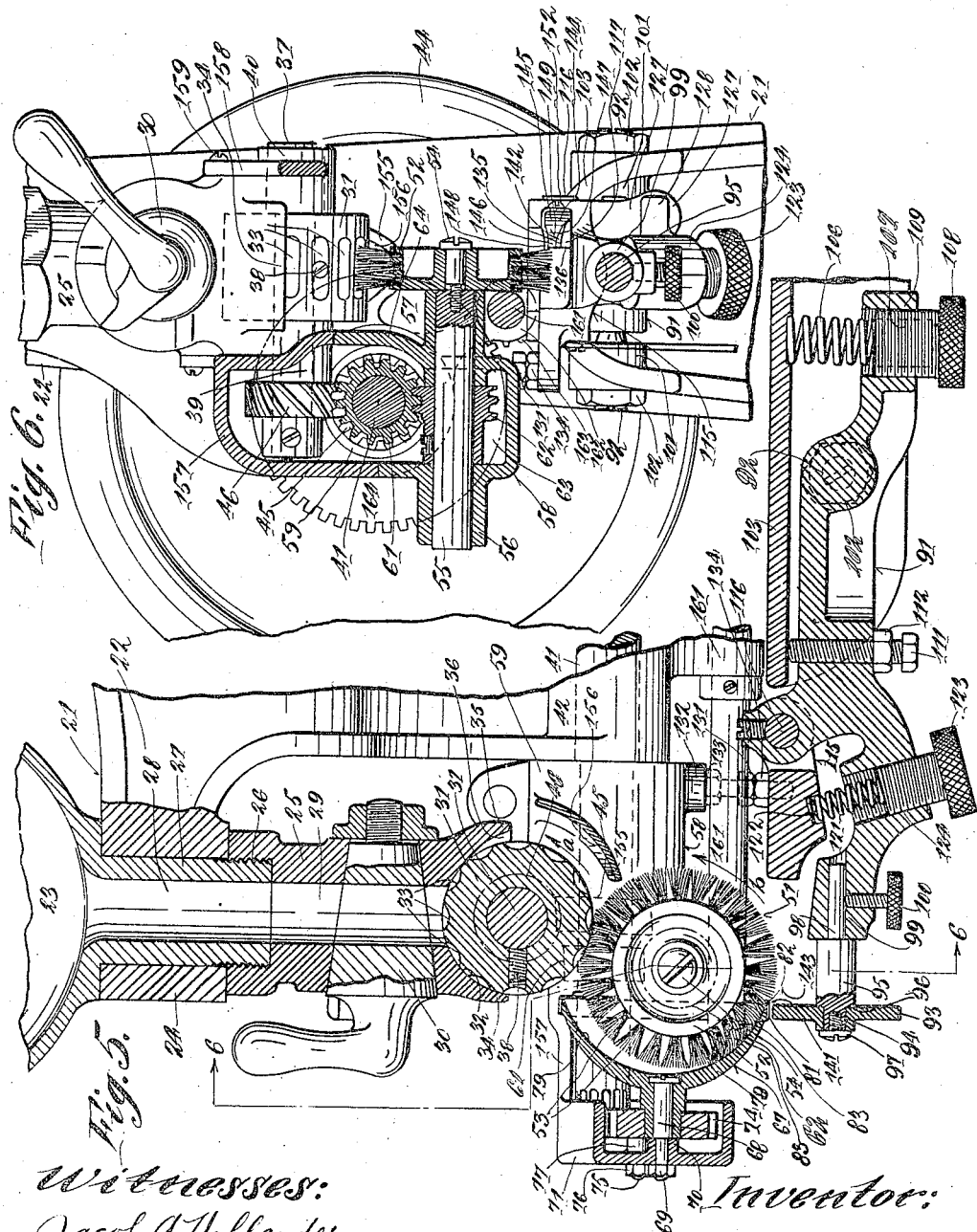

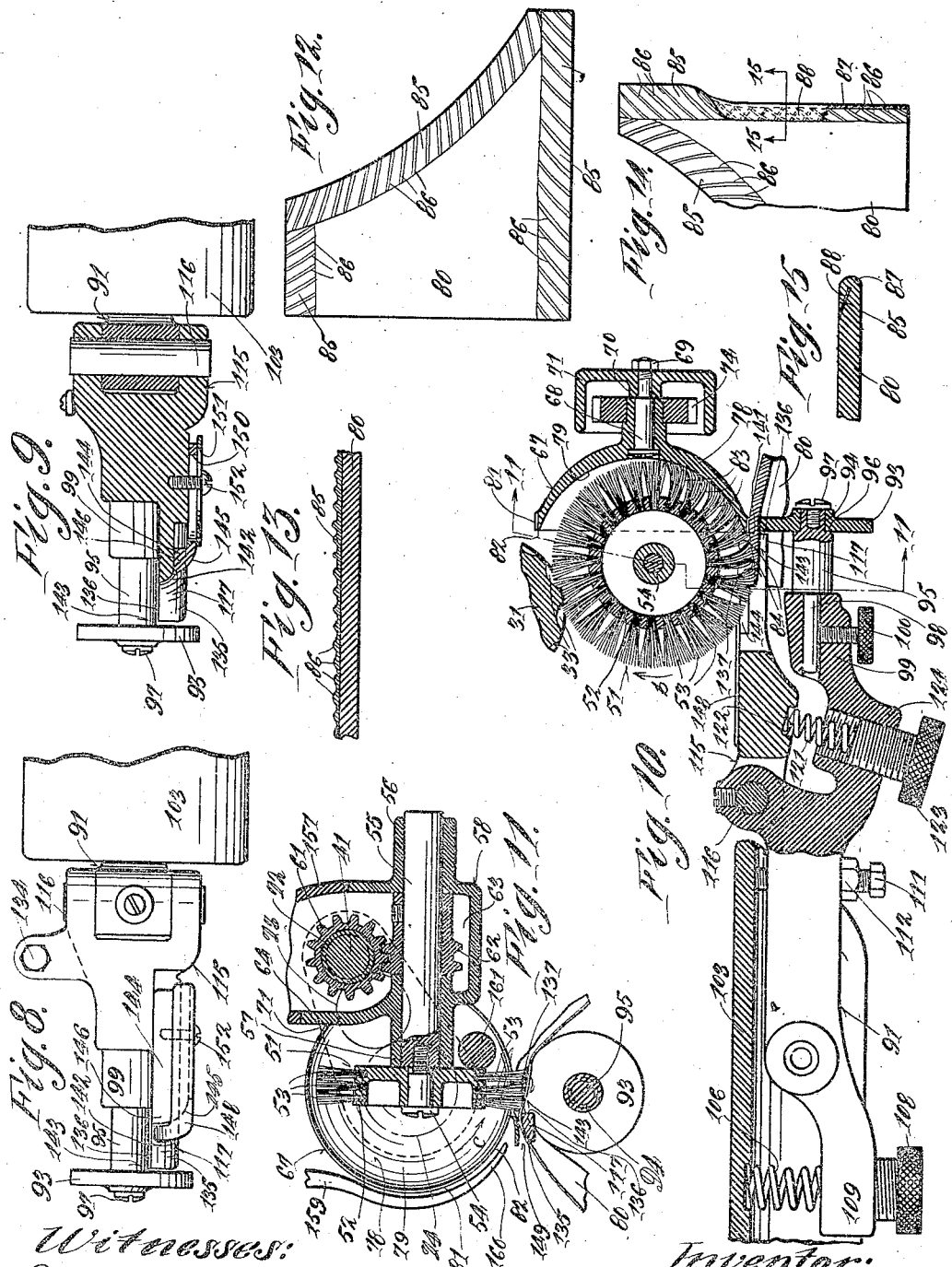

WILLIAM F. LAUTENSCHLAGER, OF CINCINNATI, OHIO.

CEMENT-APPLYING MACHINE.

1,154,419.   Specification of Letters Patent.   Patented Sept. 21, 1915.

Application filed April 6, 1914.  Serial No. 829,898.

*To all whom it may concern:*

Be it known that I, WILLIAM F. LAUTENSCHLAGER, a citizen of the United States, residing at Cincinnati, in the county of Hamilton and State of Ohio, have invented certain new and useful Improvements in Cement-Applying Machines, of which the following is a specification.

My invention relates to cement applying machines applicable for providing the margin of flexible material with a narrow band of cement in the manufacture of shoes, gloves, and containers of various kinds. These margins are usually skived. The margins in the course of manufacture of the article, are usually folded, and when it is the intention to fold the margin, the band of cement is usually approximately twice the width of the fold, so that both the surfaces within the fold shall be cemented prior to folding, for the reason that the cement employed in this art for the purpose specified has volatile ingredients and the cement adheres best to the surface of the material at its moment of application thereto, the outer surface of the cement retaining its tackiness for a period of time after its application to the material. The cement usually used in general work of this character has a rubber foundation or base, known in the trade as "rubber cement," and the cement used in cementing certain characters of material, for instance, oily leather or glazed material, contains an oil-absorbing ingredient such as chalk or other earthy substance, forming a thicker cement, known in the trade as "white" or "pink" cement, which, for convenience, will hereinafter be termed "thick cement." These cements are highly inflammable.

It is the object of my invention to provide novel means whereby cements of the character stated are readily applied in such manner as to leave a uniform and narrow band of cement on the material, and further to provide novel means whereby cement is readily applied to thin material which contains little self-supporting body without causing the material to crease or lap during the cement applying operation.

My invention consists in providing feeding means for the material arranged to feed the material in a given direction and cement-applying means acting upon the material in a direction crosswise of said first-named direction; further in providing a cement-applying means comprising a rotary brush and a feed-wheel within the periphery of which the brush is received; further, in providing a rotary cement-applying brush and a wiper or distributer in which the brush is received and the wall of which acts on the brush to distribute the cement thereon; further in novel means for supporting the material; further in novel means for guiding the material; further, in providing a rotary cement-applying brush acting to brush the cement upon the margin with a movement toward the outer edge of said margin; further to provide a feeding means adapted to advance the material during said cement application; and, further, in various parts and arrangements of parts hereinafter described.

The invention will be further readily understood from the following description and claims, and from the drawings, in which latter:

Figure 1 is a front side elevation of my improved device. Fig. 2 is a front end elevation of the same. Fig. 3 is a rear side elevation of the same partly broken away. Fig. 4 is a horizontal section taken on the irregular line 4—4 of Fig. 3, showing the means for mounting the material-supporting lever and the driving means for the cement-supplying roll and feeding means. Fig. 5 is a vertical longitudinal section taken on the line 5—5 of Fig. 2. Fig. 6 is a vertical cross-section taken on a line corresponding to the line 6—6 of Fig. 5. Fig. 7 is a sectional detail showing the manner of mounting the gearing for driving the feed roll, taken on the line 7—7 of Fig. 2. Fig. 8 is a plan detail of the outer end of the material-supports. Fig. 9 is a horizontal section of the same taken on the line 9—9 of Fig. 1. Fig. 10 is a detail in vertical section taken on the line 10—10 of Fig. 4, showing the manner of cement application. Fig. 11 is a cross-section of the same taken on the line 11—11 of Fig. 10. Fig. 12 is a plan view of a piece of material, the margin of which is shown provided with narrow bands of cement. Fig. 13 is a vertical section of the same showing the cement ridges. Fig. 14 is a plan view of a piece of material having its margin partly folded and partly broken away, and illustrating the crossing relation of the cement-ribs within the fold; and, Fig. 15 is a cross-section of the same taken on the line 15—15 of Fig. 14.

The main frame of the machine is shown at 21, and is represented as comprising a goose-neck bracket 22, which has a cement-pot 23 supported thereon in a bearing 24. 25 is a cement-feeding head, exemplified as having threaded connection 26 with the shank 27 of the cement-pot for clamping the cement-pot and the cement-feeding head in place. The shank has a cement-passage 28 therein which communicates with a cement-passage 29 in the head, the flow of cement through the latter passage being controlled by a cement-valve 30 for shutting off or regulating the flow of cement.

A cement-supplying roll 31 coacts with a mouth 32 of the cement-feeding head, (see Figs. 1 and 5), the roll being exemplified with cement-receiving recesses 33, the mouth being provided with a lip 34 contacting the periphery of the cement-supplying roll for preventing the feeding of excess cement, and with a lip 35 at the in-coming side of said periphery, this latter lip being preferably provided with a cement-return recess 36 opening outwardly, whereby excess cement is received and led back into the cement-feeding head. The cement-supplying roll is secured to a shaft 37, as by a set-screw 38, the shaft being journaled in bearings 39, 40, of the cement-feeding head.

A drive-shaft 41 is journaled in bearings 42, 43, of the main frame, and is driven by suitable means, for instance by a drive-pulley 44. The drive-shaft has drive-connection with the shaft 37, this drive-connection being exemplified as a spiral-gear 45 fast on the drive-shaft which meshes with a spiral-gear 46 fast on the shaft 37, rotating the cement-supplying roll in the direction of the arrow $a$. (See Figs. 1, 3 and 5).

Suitable means are provided for feeding the material in a given direction, and cement-applying means are provided having cement-applying portions, coacting with the margin of the material, which move in a direction crosswise of the direction of feeding movement of the material.

I have exemplified the cement-applying means coacting with the margin of the material as a brush 51, shown as a rotary brush, suitably driven in a direction for moving its periphery crosswise of the direction of feeding movement of the material.

I have exemplified the brush as comprising a hub 52, from the periphery of which bristles 53 project radially, the bristles being preferably arranged in annular rows, three of which are shown. A clamp-screw 54 is received in the bore of the brush for centering the same and clamping the same to a brush-shaft 55. (See Figs. 1, 5, 6, and 11). The brush is capable of being reversed on its shaft for flexing its bristles in opposite directions at different times of cement application, so as to maintain said bristles normally radial on the rotary brush, whereby the life of the brush is increased and its cement-applying properties enhanced.

The brush-shaft is journaled in bearings 56, 57, of a housing 58, which is clamped by means of a clamp-bearing 59 to an annular extension 60 of the bearing 42. (See Figs. 2, 3, 4 and 6). A spiral-gear 61 is fast on the drive-shaft 41 and meshes with a spiral-gear 62 fast on the brush-shaft 55. The gears 61, 62 and 45, are arranged to be received in an oil-reservoir 63, the wall 64 of the reservoir extending upwardly between the reservoir and the cement-supplying roll and cement-applying brush.

Suitable feeding means are provided for feeding the material crosswise of the plane of movement of the rotary cement-applying brush, exemplified as a feed-wheel 67 journaled on a journal-stud 68, shown as a shoulder-bolt clamped by means of a nut 69 in a bearing 70 of a gear-covering bracket 71 on the housing 58. (See Figs. 1, 2, 3, 4, 5 and 7). The drive-shaft has a pinion 72 thereon which meshes with an intermediate gear 73, the latter meshing with a gear 74 fast on the hub of the feed-wheel. The intermediate gear is journaled on a journal-stud 75, shown as a shoulder-bolt clamped by means of a nut 76 in a bearing 77 of the bracket 71.

The cement-applying brush is arranged to rotate in the direction of the arrow $b$ and the feed-wheel is arranged to rotate in the direction of the arrow $c$, the peripheral speed of the brush being preferably greater, for instance, approximately twice that of the peripheral speed of the feed-wheel, these relative speeds being instanced as examples and not as limitations.

The feed-wheel is shown of cup-form, as indicated at 78, for receiving a portion of the periphery of the rotary brush, (see Figs. 1, 4, 5 and 10), and the parts are preferably so arranged that the periphery of the brush contacts the inner wall 79 of the cup-formed feed-wheel while both the rotary brush and the feed-wheel are rotating, whereby the cement received on the brush from the cement-supplying roll is wiped or smoothed on the periphery of the brush, whereby the cement is uniformly applied to the material, the latter being indicated at 80. In the form shown the rotary brush and the feed-wheel are preferably so relatively mounted that the cement-evening contact of the bristles with the inner face of the feed-wheel increases in pressure toward the cement-applying portion of the periphery of the brush.

The arcs described by the periphery of the brush within the feed-wheel and by the inner wall of the feed-wheel approach each other toward the cement-applying portion of the brush. This is accomplished preferably by locating the axis of rotation of the rotary brush and the feed-wheel in different parallel planes substantially parallel to the normal path of the material. The rotary brush may also be of a diameter slightly less than the diameter of the truncated substantially spherical inner wall of the feed-wheel.

The feed-wheel is provided with a material-contacting rim 81, the outer edge of which forms a preferably comparatively sharp annular lip 82 for the cavity of the feed-wheel. The bristles of the brush engage the inner wall of the cavity adjacent the material-contacting portion of said lip with pressure, for causing a flexing of said bristles, as indicated at 83, (see Fig. 10), whereby cement-applying contact of the brush with the material is made with a preferably reflexing and wiping movement, as shown at 84, for applying the band of cement, indicated at 85.

The material during the cement-applying movement of the rotary brush is fed crosswise of the path in which said brush rotates, whereby the cement-brushing upon the margin of the material is accomplished in a direction which is the resultant of the movements of the brush and the feeding means, namely in a direction oblique to the direction of feed of the material. (See Figs. 12, 13 and 14). The margin being cemented is drawn lengthwise away from the brush in a direction crosswise of the brush for avoiding a wiping of the cement off of the margin by the brush subsequent to its being laid thereon by the brush, a feature especially useful in applying the thick cements hereinbefore referred to, and whereby preferably the cement is applied in alternating thicker and thinner lines, or ridges 86, arranged obliquely across the margin being cemented.

The manner of cement application is indicated in Figs. 1, 3, 5, 10 and 11, the narrow band of cement being applied to the margin of the material preferably in uniform ridge-like arrangement as indicated in Figs. 12, 13 and 14.

The fold is usually made along a crease 87 extending lengthwise of the middle of the band of cement. When the folded edge 88 of the margin is laid upon the body-portion of the margin, the lines or ridges of cement at the respective sides of the crease extend in opposite directions and crossing relations, so that the uniformly recurrent thick portions of the cement applied will lap each other and cause adhesion between the folded and body portions of the margin when pressed together.

Experience has shown that when it is desired to cement two surfaces together, it is desirable to provide each of the surfaces with a facing of cement, and that the thickness of the cement-application shall be sufficient to provide a tacky facing, whereby the two tacky surfaces will readily adhere to each other. I have found that in folding the margin of the material, for instance, skived margins, it is desirable that the cement-application shall extend across the full width of the faces intended to be lapped, and that this cement-application shall be regular in width, and that the outer edges of the bands of cement shall be pronounced and sufficiently thick to provide ready adhering properties at said outer edges, so that, when the fold of the margin of the material is folded back upon the body of said margin, as indicated in Figs. 14 and 15, there shall be a sufficient facing of cement on each of the inner faces of the folded margin to insure proper adherence between said fold and body. Laying the cement in ridge-like arrangement increases the efficiency of the cement-application and insures adherence of the fold to the body of the margin for the reason that the ridges when the fold is made are arranged in crossing relation, one upon the other, within the fold.

I have shown a material-supporting and guiding means coacting with the feed-wheel and brush exemplified as follows: A primary lever 91 is pivoted on trunnion-screws 92. (See Figs. 1, 3, 4, 5, 6 and 10). A material-supporting wheel 93 is journaled on a journal 94 of a stud 95, the feed-wheel being rotatively held between an annular shoulder 96 of said stud and a retaining screw 97. The stud has a stem 98 clamped in a bearing 99 of the lever 91 by means of a set-screw 100. The trunnion-screws 92 are threaded in bearings 101 and secured in adjusted positions by means of lock-nuts 102, these bearings being in a shelf 103. A spring 106 is received against said shelf and is mounted in the socket 107 of an adjusting screw 108 adjustable in a threaded bearing 109 of the lever 91 for determining the readiness of yield of the wheel 93. A set-screw 111, threaded in the lever and held in adjusted position by a jamb-nut 112 impinges the shelf 103 for adjusting the approach between the wheel 93 and the feed-wheel 67.

An auxiliary lever 115 is pivoted at 116 to the primary lever and has on it a support 117 upon which the margin of the material arranged to be supplied with the band of cement is supported. The support is normally urged upwardly by a spring 121 received in a socket 122 of the auxiliary lever and in the socket of a socket-screw 123 adjustable in a threaded bearing 124 of the primary lever. The upward limit of the support with relation to the primary lever is controlled by an adjusting screw 126 adjustable in an arm 127 of the auxiliary lever and arranged to contact a lug 128 on the primary lever and locked in adjusted positions by a lock-nut 129.

For adjusting the approach of the supporting wheel 93 toward the feed-wheel and the support 117 toward the cement-applying brush, a set-screw 131 is provided, adjustable in a depending lug 132 depending from the housing 58 and held in adjusted positions by a lock-nut 133, the set-screw being arranged to strike the head of a bolt 134 threaded into the auxiliary lever. The forward or in-feeding side of the support 117 is rounded, as shown at 135, (see Figs. 2, 6, 8, 9 and 11), to conform substantially to the rounding of the wheel 93, the support preferably terminating at its rear edge 136 adjacent the forward face of said brush, so that when the machine is running without material passing therethrough a minimum surface of the support is presented to the brush, this surface being merely an edge surface which would in turn be wiped clean by the edge of the material fed therethrough, so that defacing of the face side of the material is avoided, it being understood that the face side of the material when being fed through the machine herein exemplified is presented toward the lower roll and the support. This arrangement of parts has the further advantage that the material is urged toward the cement-applying brush with greater force at the points of initial contact of the brush with the margin of the material, which in the present exemplification would be at points above the supporting-wheel 93 at the side and above the rear edge 136 of the support 117 at the front, whereby a hollow 137 (see Figs. 10 and 11), is formed under the out-feeding and outer edge portions of the margin of the material under the brush, for permitting yield of the margin being cemented which increases toward said out-feeding and outer edge portions, which yield, while it is not sufficient to prevent cement-application upon said margin portions, aids in preventing a wiping away of the cement previously applied, which is especially useful in cement-application to oily and glazed surfaces.

In order to aid in cleanliness of work, the lower feed-roll is off-set from the upper feed-roll so as to leave a space 141, (see Figs. 1, 3, 5 and 10), indicating the off-set relation between the two wheels, whereby contact of the brush with the lower feed-wheel is avoided.

My improved device further enables the width of the band of cement-application to be adjusted by merely adjusting the gage against which the edge of the material is received, so that cement-applications of different widths may be applied at the margin of the material. The support is provided with a rearwardly upwardly inclined supporting face, as shown at 142, so that the tapering edge of the skived material, which becomes thinner as it approaches the outer edge thereof, is raised into contact with the brush, so that the brush will act on the same in the cement application. The construction really forms a rearwardly tapering recess 143, (see Figs. 5, 8, 9, 10 and 11), between the arc of the periphery of the rotary cement-applying brush and the support below, in which the tapering edge of the material is received, for causing uniformity of cement-application.

The gage, shown at 144, has a rounded front end 145 and a laterally extending tongue 146, (see Figs. 6, 8 and 9), the latter having its lower face rounded, as shown at 147, to conform to the rounding of the forward edge of the material-support, so that the tongue may be adjusted lengthwise of this rounded edge and be in close relation therewith. A hold-down finger 148 coacts with the gage and is arranged to hold down the edge of the material, forming a channel 149 between it and the material-support through which the edge of the material is guided. The gage is provided with a slot 150, and the hold-down finger with a slot 151, a screw 152 passing through said slots and threaded into the auxiliary lever for securing the gage and the hold-down finger in adjusted positions. The adjustments of the parts permits the gage to be retracted for a greater width of margin being cemented, while the finger may be adjusted forwardly for extending over a greater portion of the margin being cemented, or other relative adjustments of the parts may be had.

In order to provide further cleanliness of operation I provide a cement-directing shelf 155 arranged to receive any droppings of cement from the in-feeding portion of the cement-supplying head, for instance when the machine is being run idle, and directing the same to the brush for being carried to the upwardly moving face of the brush toward the cement-supplying roll and back into the head. I have shown this shelf as projecting from the housing 58 and provided with a cement-directing groove 156.

I have exemplified the axis of rotation of the cement-applying brush as extending at right angles to the axis of rotation of the feed-wheel, but I do not desire to be limited to such relations of parts.

A gear-cover 157 may be provided above the gears for the cement-supplying roll.

A finger guard 158 is secured to the cement-feeding head, as by screws 159, and has a lower curved end 160 received in front of and under the feed-roll for guarding against contact of the finger of the operator with the feed-roll.

Cement of the character herein mentioned has a tendency to "string" during application. In order to avoid the detrimental effects of this stringing I provide a rotary part in rear of the brush. Thus a rotary finger 161 is journaled in a bearing 162 and has a gear 163 fast thereon which is meshed by a gear 164 fast on the drive-shaft. The finger preferably acts in close proximity to the rear face of the brush and continuously rotates for wrapping upon it the strings of cement and transferring the same back upon the brush. It further acts to press upon the rear face of the brush if the brush is spread by excess cement therein, whereby the excess cement is pressed out of the brush and transferred back into the cement-head through the return-recess 36. The rotary finger further preferably extends into the cavity of the cup-like feed-wheel, thereby wrapping upon itself any strings formed at the edge of the cavity of the feed-wheel and wiping the same back upon the brush.

Having thus fully described my invention, what I claim as new and desire to secure by Letters Patent, is:

1. In a machine for applying cement to the margin of flexible material, the combination of means for feeding the material lengthwise of the margin, and cement-applying means acting solely on said margin and movable crosswise of said margin for applying cement thereto.

2. In a cement applying machine of the character described, the combination of material-feeding means operable for feeding the material in a given direction, and a rotary cement-applying part operable solely on the margin of the material crosswise of said given direction.

3. In a machine for applying cement to the margin of flexible material, the combination of a material-feeding wheel, and a rotary cement-applying brush acting solely on said margin, the axes of rotation of said wheel and brush extending in different directions and having closest approach to a point nearest to said margin.

4. In a machine for applying cement to the margin of flexible material, the combination of material-feeding means, a rotary cement-applying part operable on said margin crosswise of said margin, and a pivoted material-support for the margin of the material yieldable in a direction substantially parallel to the path of rotation of the cement-applying part.

5. In a cement applying machine for cementing the margin of flexible material, the combination of material-feeding means acting on the material adjacent to its edge for feeding the same lengthwise of its margin, a pivoted support for the margin of the material, a rotary cement-applying part operable on said margin, and means for rotating said cement-applying part in a direction crosswise of said margin, said cement-applying part having a cement-applying portion between the material-contact portions of said material-feeding means and the pivot of said material-support.

6. In a machine for applying cement to the margin of flexible material, the combination of material-feeding means acting on the material adjacent to its edge, a pivoted support for the margin of the material, a rotary cement-applying part acting on said margin, means for rotating said cement-applying part in a direction crosswise of said margin, said cement-applying part having a cement-applying portion between said material-feeding means and the pivot of said material-support, said material-support having a material-supporting face inclined toward said cement-applying part.

7. In a machine for applying cement to the margin of flexible material, the combination of material-feeding means acting on the material adjacent to its edge, a pivoted material-support, and a rotary cement-applying part having a cement-applying portion acting on the margin of the material between the planes parallel to the normal line of feeding movement of the material and substantially perpendicular to the normal plane of said material, in which said feeding means have their feeding movement and in which the pivotal axis of said support is located, and means for rotating said rotary cement-applying part in a path which when extended intersects said planes.

8. In a cement applying machine of the character described, the combination of a cup-shaped rotary feed-wheel and a rotary cement-applying brush received partly within said cup-shaped feed-wheel.

9. In a cement applying machine of the character described, the combination of a rotary cement-applying brush, and a cup-shaped feed-wheel for the material within which said brush is partially received and against the inner wall of which said brush has wiping movement.

10. In a cement applying machine for cementing the margin of flexible material, the combination of a cup-shaped rotary feed-wheel and a rotary cement-applying brush comprising bristles having wiping contact with the inner wall of said feed-wheel for flexing said bristles, and a material-support for the margin of the material arranged for supporting said margin for contact by said brush at the side of said feed-wheel.

11. In a cement applying machine of the character described, the combination of a rotary cement-applying brush and a rotary wall against which said brush makes wiping contact for distributing the cement thereon, the axes of rotation of said brush and wall being non-parallel.

12. In a machine for applying cement to the margin of flexible material, the combination of a rotary cement-applying brush, feeding means for the material for feeding the material crosswise of the direction of movement of said brush, and a material-support at the side of said rotary cement-applying brush having a material supporting face normally extending into the longitudinal projection of said rotary cement-applying brush.

13. In a machine for applying cement to the margin of flexible material, the combination of a rotary cement-applying brush, material-feeding means for feeding the material in a direction crosswise of the direction of movement of said brush, and a material-support coacting with said brush at the side of and normally extending into the longitudinal projection of said rotary cement-applying brush.

14. In a machine for applying cement to the margin of flexible material, cement-applying means acting solely on said margin and movable crosswise of said margin for applying cement thereto.

15. In a machine for applying cement to the margin of flexible material, the combination of a rotary cement-applying brush, a yieldable pivotal support for the margin of the material, and means for rotating said brush, said pivotal support having a supporting face for the margin of the material which approaches said rotary cement-applying brush from the side of said brush for forming a tapering recess in which the margin of the material is received, said recess tapering toward said brush from the side of said brush, and said brush rotatable and said pivoted support yieldable in substantially similar directions.

16. In a machine for applying cement to the margin of flexible material, the combination of a rotary cement-applying brush, a feed-wheel in which said brush is partially received, said feed-wheel having a material-feeding periphery, a coacting feed-wheel, a lever on which said coacting feed-wheel is located and having a material-support thereon for the margin of the material, the inner edge of the material-contacting periphery of said last-named feed-wheel rotatable in a path offset outwardly from the path of rotation of the inner edge of the periphery of said first-named feed-wheel.

17. In a machine for applying cement to the margin of flexible material, the combination of a rotary cement-applying brush, means for feeding the material in a direction crosswise of the path of movement of said brush, a wiper for the bristles of said brush acting to flex said bristles adjacent to the margin being cemented and for releasing said flexed bristles into contact with said margin with a movement crosswise of the direction of the feeding movement of said margin.

18. In a machine for applying cement to the margin of flexible material, the combination of a rotary cement-applying brush, means for feeding the material in a direction crosswise of the path of movement of said brush, a wiper for the bristles of said brush acting to flex said bristles adjacent to the margin being cemented and for releasing said flexed bristles into contact with said margin with a movement crosswise of the direction of the feeding movement of said margin, and a yieldable margin-support for urging said margin into contact with said bristles.

19. In a machine for applying cement to the margin of flexible material, the combination of a rotary cement-applying brush, means for feeding the material in a direction crosswise of the path of movement of said brush, a wiper for the bristles of said brush acting to flex said bristles adjacent to the margin being cemented and for releasing said flexed bristles into contact with said margin with a movement crosswise of the direction of the feeding movement of said margin, and a yieldable margin-support for urging said margin into contact with said bristles, said margin-support having a supporting face for the margin which is slantingly arranged rearwardly toward the outer edge of said margin in a direction toward the bristles of said brush.

20. In a machine for applying cement to the margin of flexible material, the combination of a rotary cement-applying brush arranged to act upon the margin of the material, feeding means for the material, a material-support for the margin of the material having a material-supporting face located solely at the side of said brush, and a gage for the outer edge of said margin adjustable in a direction similar to the plane of the material and the direction of the path of movement of said rotary cement-applying brush.

21. In a machine for applying cement to the margin of flexible material, the combination of a rotary cement-applying brush arranged to act upon the margin of the material, feeding means for the material, a material-support for the margin of the material, a gage for the outer edge of said margin adjustable in a direction similar to the direction of the path of movement of said rotary cement-applying brush, and a hold-down finger coacting with said gage.

22. In a machine for applying cement to the margin of flexible material, the combination of a rotary cement-applying brush arranged to act upon the margin of the material, feeding means for the material, a material-support for the margin of the material, a gage for the outer edge of said margin adjustable in a direction similar to the direction of the path of movement of said rotary cement-applying brush, a hold-down finger coacting with said gage, and means for independently adjusting said gage and hold-down finger.

23. In a machine for applying cement to the margin of flexible material, the combination of a rotary cement-applying brush, a feed-wheel within which a portion of said brush is received, a rotary wiping part against which said brush rotates, a coacting feed-wheel for said first-named feed-wheel, a yieldable material-support, and means whereby independent yielding of said second-named feed-wheel and said material-support is effected.

24. In a machine for applying cement to the margin of flexible material, the combination of a rotary cement-applying brush, a feed-wheel in which a portion of said brush is received, a coacting feed-wheel, said feed-wheels arranged for feeding the margin of the material across the path of movement of said brush, a pivotal support on which said feed-wheel is mounted, a pivoted support for the margin of the material coacting with said brush, and constructed and arranged for permitting yield of said support independent of said second-named feed-wheel.

25. In a machine for applying cement to the margin of flexible material, the combination of a rotary cement-applying brush, feeding means for feeding the margin of the material in a direction crosswise of the path of rotation of said brush, and material-supporting means for the margin of the material having a recess under the feeding-out side of said brush.

26. In a machine for applying cement to the margin of flexible material, the combination of a rotary cement-applying brush, feeding means for feeding the margin of the material in a direction crosswise of the path of rotation of said brush, material-supporting means for the margin of the material having a recess under the feeding-out side of said brush, said material-supporting means having a margin-contact portion coacting with the feeding-in side of said brush, and arranged for permitting flexing of said margin adjacent to the feeding-out side of said brush.

27. In a machine for applying cement to the margin of flexible material, the combination of a rotary cement-applying brush, feeding means for feeding the margin of the material in a direction crosswise of the path of rotation of said brush, material-supporting means for the margin of the material having a recess under the feeding-out side of said brush, said support having contacting portions for the inner edge of said margin opposite the path of movement of said brush and at the feeding-in side of said brush, and arranged for permitting flexing of said margin toward the outer edge of said margin and the feed-out side of said brush.

28. In a machine for applying cement to the margin of flexible material, the combination of feeding means for the margin of the material, a cement-feeding head, a cement-supplying roll having an axis of rotation substantially parallel to the path of movement of said feeding means, a rotary cement-applying brush having an axis of rotation substantially parallel to the axis of rotation of said cement-supplying roll, and a shelf under said cement-supplying roll extending toward said rotary cement-applying brush.

29. In a cement applying machine of the character described, the combination of a rotary cement-applying brush, and a rotary cup-shaped wiper within which a portion of said brush is received, and material-feeding means for the margin of the material, the axes of rotation of said rotary cement-applying brush and of said cup-shaped wiper being located in different planes substantially parallel to the plane of the face of the margin of the material being fed.

30. In a cement applying machine of the character described, the combination of a rotary cement-applying brush, and a rotary cup-shaped wiper within which a portion of said brush is received, and material-feeding means for the margin of the material, the axes of rotation of said rotary cement-applying brush and of said cup-shaped wiper located in different planes parallel to the plane of the face of the margin of the material being fed, said cup-shaped wiper being of substantially truncated spherical form, and the diameter of said rotary cement-applying brush being less than the diameter of the sphere upon which said truncated spherical wall is described.

31. In a cement applying machine of the character described, the combination of a rotary cement-applying brush, feeding means for the margin of the material for feeding said margin crosswise of said brush, a truncated spherical wiper for said brush in which a portion of said brush is received, a support for the margin of the material, the arcs on which the periphery of said brush and said cement wiping wall are described approaching each other adjacent to said material-support.

32. In a machine for applying cement to the margin of flexible material, the combination of material-feeding means, and a rotary cement-applying brush acting solely upon a narrow strip on the margin and acting to brush the cement upon the margin with a movement toward the outer edge of the margin.

33. In a machine for applying cement to the margin of flexible material, the combination of a rotary cement-applying brush acting to brush the cement solely upon the margin of the material with a movement toward the outer edge of said margin, and with the bristles of said brush passing said edge, and material-feeding means for feeding the margin of the material across the cement-applying portion of said brush during said cement application thereof.

34. In a machine for applying cement to the margin of flexible material, the combination of a rotary cement-applying brush acting to brush the cement upon the margin of the material with a movement toward the outer edge of said margin, material-feeding means for feeding the margin of the material across the cement-applying portion of said brush during said cement application thereof, and a rotary wiper for said brush within which said brush is partially received.

35. In a machine for applying cement to the margin of flexible material, the combination of feeding means for the margin of the material for feeding said material in a given direction, a rotary driven part, a reversible rotary cement-applying brush comprising cement-applying bristles, means for securing said brush to said rotary driven part in reverse positions, whereby the bristles of said brush are flexed in opposite directions, said brush acting to brush the cement upon the margin with a movement toward the outer edge of said margin.

36. In a machine for applying cement to the margin of flexible material, the combination of material-feeding means for feeding the margin of the material in a given direction, a rotary cement-applying brush acting to brush the cement on said margin with a movement toward the outer edge of said margin, and means for rotating said cement-applying brush with a peripheral speed greater than the feeding movement of said feeding means.

37. In a cement applying machine of the character described, the combination of a rotary cement-applying brush having bristles arranged annularly completely around the periphery of said brush in a plane perpendicular to the axis of rotation of said brush for forming a closed narrow ring of bristles about the periphery of said brush, and feeding means for the margin of the material for feeding said margin crosswise of the path in which said brush rotates, whereby the cement application upon said margin is effected in a direction which is the resultant of the movements of said brush and feeding means.

38. In a machine for applying cement to the margin of flexible material, the combination of a rotary cement-applying part, a gage for the edge of the material feeding means for the margin of the material for feeding said margin crosswise of said gage and of the direction in which said cement-applying part rotates, whereby said rotary cement-applying part acts solely on said margin for applying cement thereto and whereby the cement application upon the margin of the material is accomplished in a direction oblique to the directions of movement of the cement-applying part and of the feeding movement of said margin.

39. In a machine for applying cement to the margin of flexible material, the combination of a rotary cement-applying part, a gage for the edge of the material feeding means for the margin of the material for feeding said margin crosswise of said gage and of the direction in which said cement-applying part rotates, whereby said rotary cement-applying part acts solely on said margin for applying cement thereto and whereby the cement is laid upon said margin by said cement-applying part in recurrent ridges extending in directions oblique to the direction of movement of said rotary cement-applying part and the direction of feed of the material.

40. In a machine for applying cement to the margin of flexible material, the combination of rotary cement-applying means, a gage for the edge of the margin of the material, and feeding means for feeding the margin of the material crosswise of the path of movement of said cement-applying means, whereby the cement is laid solely upon said margin in directions oblique to the length of said margin.

41. In a machine for applying cement to the margin of flexible material, the combination of rotary cement-applying means having a flexible cement-applying surface, a gage for the edge of the margin of the material and feeding means for feeding the margin of the material crosswise of said gage and of the path of movement of said cement-applying means, whereby the cement is laid upon said margin in ridges extending obliquely to the direction of said margin, whereby when said margin is folded said ridges are arranged in crossing relation within the fold.

42. In a cement applying machine of the character described, a rotary cement-applying part operable solely on the margin of the material crosswise of said margin for applying a narrow band of cement to said margin, and a support for the margin of the material having a supporting surface for the margin located at the side of said rotary cement-applying part.

43. In a machine for applying cement to the margin of flexible material, the combination of a rotary cement-applying brush, and a rotary feed-wheel, said brush and feed-wheel having axes of rotation which are substantially at right angles to each other, and a material-support for the margin of the material having a pivotal axis substantially parallel to the axis of rotation of said brush.

44. In a machine for applying cement to the margin of flexible material, the combination of a rotary cement-applying brush, a feed-wheel for the material, and a pivoted support for the margin of the material, the vertical plane parallel to the axis of rotation in said feed-wheel in which said axis is located when extended intersecting similar planes in which the axis of rotation of said rotary brush and the pivotal axis of said support when extended are located.

45. In a machine for applying cement to the margin of flexible material, the combination of feeding means for the material, a rotary cement-applying brush acting to brush the cement upon the margin of the material with a movement crosswise of the direction of feeding movement of the material and toward the outer edge of said margin, and a gage for the edge of the material adjustable toward and from said feeding means, whereby the width of the cement application by said rotary brush is controlled.

46. In a machine for applying cement to the margin of flexible material, the combination of a rotary cement-applying brush, feeding means for the material for feeding the margin of said material crosswise of the path of movement of said brush, and a material-support coacting with said brush located solely in advance of the feeding-in side of said brush.

47. In a machine for applying cement to the margin of flexible material, the combination of feeding means, a rotary cement-applying part, means for causing said rotary cement-applying part to rotate in a direction transverse to the direction of the feeding movement of the feeding means, and a rotary finger at the side of said rotary cement-applying part, for the purpose described.

48. In a machine for applying cement to the margin of flexible material, the combination of feeding means, a rotary cement-applying part, a cup-shaped wiper in which said rotary cement-applying part is partially received, means for causing said rotary cement-applying part to rotate in a direction transverse to the direction of the feeding movement of the feeding means, and a rotary finger at the side of said rotary cement-applying part extending into the cavity of said cup-shaped wiper, for the purpose described.

49. In a machine for applying cement to the margin of flexible material, the combination of a rotary cement-applying brush, feeding means for feeding the margin of the material crosswise of the path of rotation of the brush, and a rotary cement-string receiving finger rotating at the feeding-out side of said brush.

50. In a machine for applying cement to the margin of flexible material, the combination of a rotary cement-applying brush comprising a cement-applying bristle-portion, feeding means for feeding the margin of the material crosswise of the path of rotation of the brush, and a rotary cement-string receiving finger rotating at the feeding-out side of said brush and arranged for pressing upon the side of said cement-applying bristle-portion.

51. In a machine for applying cement to the margin of flexible material, the combination of a rotary cement-applying brush, feeding means for feeding the margin of the material crosswise of the path of rotation of said brush, a cup-shaped wiper in which a peripheral portion of said rotary cement-applying brush is received, and a rotary cement-string receiving finger at the feeding-out face of said rotary cement-applying brush received in the cavity of said cup-shaped wiper.

52. In a cement-applying machine of the character described, a rotary cement-applying part operable solely on the margin of the material crosswise of said margin for applying a narrow band of cement to said margin, and a support for the margin of the material extending and adjustable in a direction substantially parallel to the path of movement of said rotary cement-applying part.

53. In a machine for applying cement to the margin of flexible material, the combination of a rotary cement-applying part operable on said margin crosswise of said margin, and a material-support for the margin of the material extending in a direction substantially parallel to the path of rotation of said cement-applying part.

54. In a machine for applying cement to the margin of flexible material, the combination of a rotary cement-applying part operable on said margin crosswise of said margin, and a material-support for the margin of the material extending in a direction substantially parallel to the path of rotation of said cement-applying part and adjustable in a path substantially parallel to said last-named path.

55. In a machine for applying cement to the margin of flexible material, the combination of a support for the margin of the material, and a rotary cement-applying part acting on said margin, means for rotating said cement-applying part in a direction crosswise of said margin, said material-support having a material-supporting face inclined toward said cement-applying part at the side of said cement-applying part.

56. In a machine for applying cement to the margin of flexible material, the combination of a rotary cement-applying brush, and a material-support having a material-supporting face normally extending into the longitudinal projection of said rotary cement-applying brush.

57. In a machine for applying cement to the margin of flexible material, the combination of a rotary cement-applying brush, a support for the margin of the material at the side of said brush, and means for rotating said brush, said support having a supporting face for the margin of the material which approaches said rotary cement-applying brush from the side of said brush for forming a tapering recess in which the margin of the material is received, and said recess tapering toward said brush from the side of said brush.

58. In a machine for applying cement to the margin of flexible material, the combination of a rotary cement-applying brush, a gage against which the edge of the margin of the material is fed in a direction crosswise of the path of movement of said brush, and a wiper for the bristles of said brush acting to flex said bristles adjacent to the margin being cemented and for releasing said flexed bristles into contact with said margin with a movement crosswise of the direction of said feeding movement.

59. In a machine for applying cement to the margin of flexible material, the combination of a rotary cement-applying brush, a gage against which the edge of the margin of the material is fed in a direction crosswise of the path of movement of said brush, and a wiper for the bristles of said brush acting to flex said bristles adjacent to the margin being cemented and for releasing said flexed bristles into contact with said margin with a movement crosswise of the direction of said feeding movement, the path of the bristles of said brush extending past said edge of said margin.

60. In a machine for applying cement to the margin of flexible material, the combination of a rotary cement-applying brush, a gage against which the edge of the margin of the material is fed in a direction crosswise of the path of movement of said brush, a wiper for the bristles of said brush acting to flex said bristles adjacent to the margin being cemented and for releasing said flexed bristles into contact with said margin with a movement crosswise of the direction of said feeding movement of said margin, and a margin-support for the material at the side of said rotary cement-applying brush.

61. In a machine for applying cement to the margin of flexible material, the combination of a rotary cement-applying brush arranged to act crosswise upon the margin of the material, a material-support for the margin of the material at the side of said brush, a gage for the outer edge of said margin, and means for adjusting said gage in a direction substantially parallel to the path of movement of the rotary cement-applying brush.

62. In a machine for applying cement to the margin of flexible material, the combination of a rotary cement-applying part arranged to act crosswise upon the margin of the material for applying cement thereto, a material-support for the margin of the material at the side of said rotary cement-applying part, a gage for the outer edge of said margin, means for adjusting said gage in a direction substantially parallel to the path of movement of said rotary cement-applying part, and a hold-down finger coacting with said gage.

63. In a machine for applying cement to the margin of flexible material, the combination of a rotary cement-applying part for applying cement to said margin, said margin arranged for being fed in a direction crosswise of the path of rotation of said rotary cement-applying part, material-supporting means for said margin at the infeeding side of said rotary cement-applying part and arranged for permitting flexing of said margin out of the normal plane of the material adjacent to the feeding-out side of said brush.

64. In a machine for applying cement to the margin of flexible material, a rotary cement-applying brush, a gage for the edge of the material, and arranged for the feeding of the material across said gage and across said brush, means for rotating said brush on an axis of rotation substantially parallel to said feeding movement, said rotary cement-applying brush acting upon a narrow strip of said margin and acting to brush the cement upon the said margin with a movement toward its outer edge.

65. In a machine for applying cement to the margin of flexible material, the combination of a rotary cement-applying brush, a gage for the edge of the material at the side of said brush, and constructed and arranged whereby to feed the material across said gage and brush, said rotary cement-applying brush acting to brush the cement solely upon the margin of the material with a movement toward the outer edge of said margin and with the bristles of said brush passing said outer edge.

66. In a machine for applying cement to the margin of flexible material, a reversible rotary cement-applying brush comprising cement-applying bristles, a gage for the edge of the material, and constructed and arranged for the feeding of the material across said gage and brush, a rotary driven part for rotating said brush with an axis of rotation substantially parallel to the direction of said feeding movement, and means for securing said brush to said rotary driven part in reverse directions whereby the bristles of said brush are flexed in opposite directions, said brush acting to brush the cement upon the margin of the material with a movement toward the outer edge of said margin.

67. In a machine for applying cement to the margin of flexible material, the combination of a rotary cement-applying part, and a gage for the edge of the material, constructed and arranged for feeding the margin of the material crosswise of said gage and of the path of said rotary cement-applying part whereby the cement on the material is applied solely on the margin thereof and the cement-application upon said margin is accomplished in a direction oblique to the directions of movement of the cement-applying part and of the feeding movement of said margin.

68. In a machine for applying cement to the margin of flexible material, the combination of a rotary cement-applying part, and a gage for the edge of the material, constructed and arranged whereby the margin is fed crosswise of said gage and of said rotary cement-applying part whereby said rotary cement-applying part acts solely on said margin for applying cement thereto and the cement is laid upon said margin by said cement-applying part in recurrent ridges extending in directions oblique to the direction of movement of said rotary cement-applying part and the direction of feeding movement of the material.

69. In a machine for applying cement to the margin of flexible material, the combination of a rotary cement-applying brush, and a rotary cement-string receiving finger rotating at the feeding-out side of said brush.

70. In a machine for applying cement to the margin of flexible material, the combination of a rotary cement-applying brush comprising a cement-applying bristle-portion, and a rotary cement-string receiving finger rotating at the feeding-out side of said brush arranged for pressing upon the side of said cement-applying bristle-portion.

In testimony whereof, I have hereunto signed my name, in the presence of two subscribing witnesses.

WILLIAM F. LAUTENSCHLAGER.

Witnesses:
  CHARLES E. WEBER,
  THERESA M. SILBER.